United States Patent [19]

Barbero

[11] Patent Number: 5,367,541

[45] Date of Patent: Nov. 22, 1994

[54] METHOD AND APPARATUS FOR SETTING ASYNCHRONOUS TRANSMISSION CHARACTERISTICS IN A TELECOMMUNICATION EQUIPMENT INCLUDING A SCC

[75] Inventor: Christian Barbero, Saint Laurent du Var, France

[73] Assignee: International Business Machines Corporation, Armonk, N.Y.

[21] Appl. No.: 877,513

[22] Filed: May 1, 1992

[30] Foreign Application Priority Data

Nov. 29, 1991 [EP] European Pat. Off. ......... 91480176.6

[51] Int. Cl.⁵ .............................................. H04L 7/00
[52] U.S. Cl. .................................... 375/106; 375/121; 370/91; 371/49.3
[58] Field of Search ................... 375/10, 121, 106, 8; 371/49.1, 49.2, 49.3; 370/91, 84

[56] References Cited

U.S. PATENT DOCUMENTS

| | | | |
|---|---|---|---|
| 4,663,766 | 5/1987 | Bremer | 375/13 |
| 5,008,902 | 4/1991 | Key et al. | 375/10 |
| 5,161,163 | 11/1992 | Bossen et al. | 371/49.3 |
| 5,195,093 | 3/1993 | Tarrab et al. | 371/49.1 |
| 5,222,081 | 6/1993 | Lewis et al. | 375/121 |

Primary Examiner—Stephen Chin
Assistant Examiner—T. Ghebretinsae
Attorney, Agent, or Firm—John J. Timar; Homer L. Knearl

[57] ABSTRACT

Method for setting the asynchronous transmission characteristics in a telecommunication equipment including a Serial Communication Controller (SCC) operating at different transmission rates, parity modes and numbers of bit per character. The method according to the present invention involves the step of setting the SCC at the higher communication rate in a none parity mode with a number of 8 bits per character. There is received a predetermined sequence of characters consisting in a succession of "Carriage Return" (CR) and "." characters. The method further involves the step of processing at least three received characters (CR, ., CR) involving the step of analyzing said received characters by comparing them with predetermined values simultaneous with the detection of parity errors, the processing step further involving the step of setting in responsive to the analyzing step, the SCC with the actual number of bits per character and the real parity mode which is used in the asynchronous transmission.

9 Claims, 8 Drawing Sheets

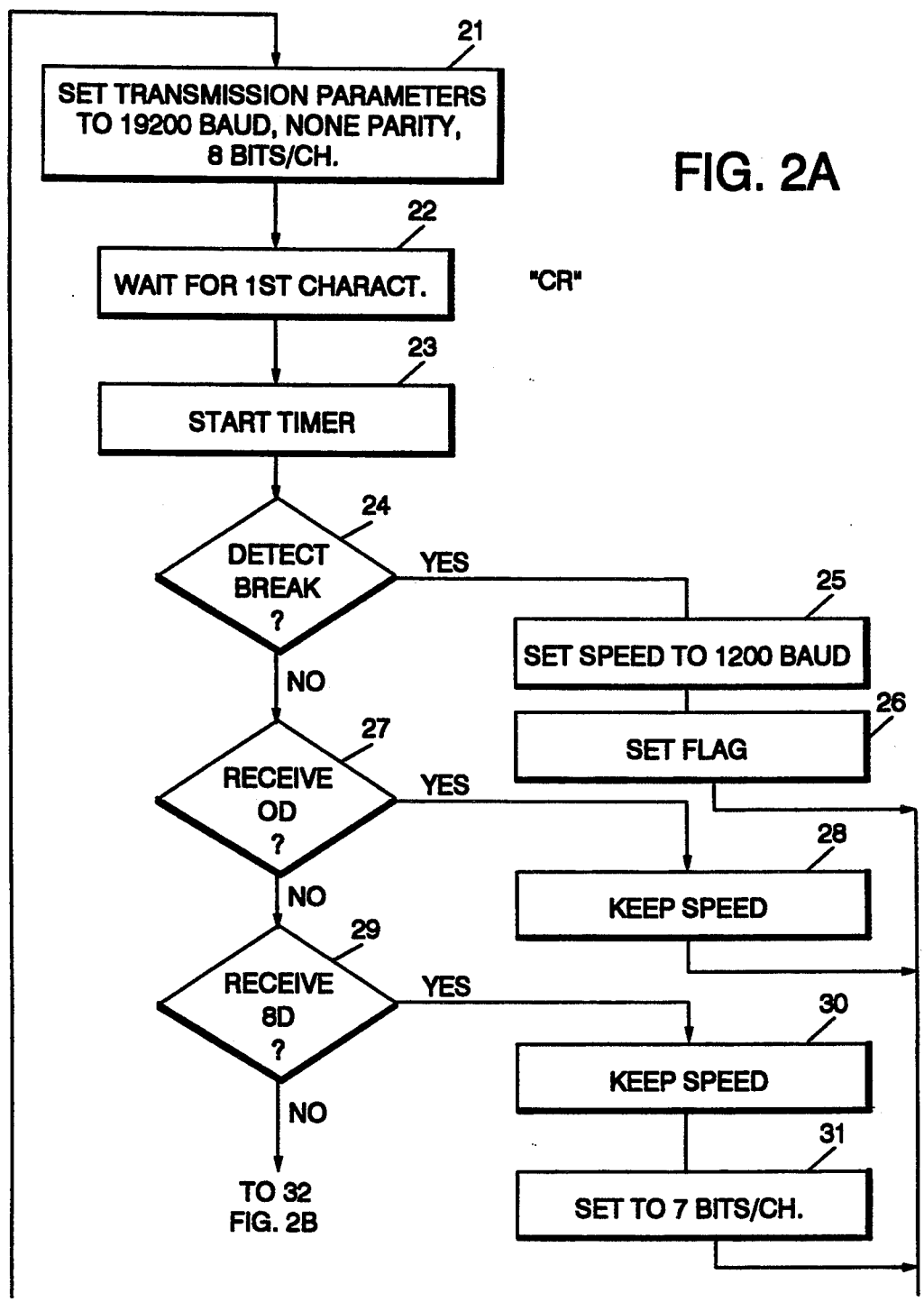

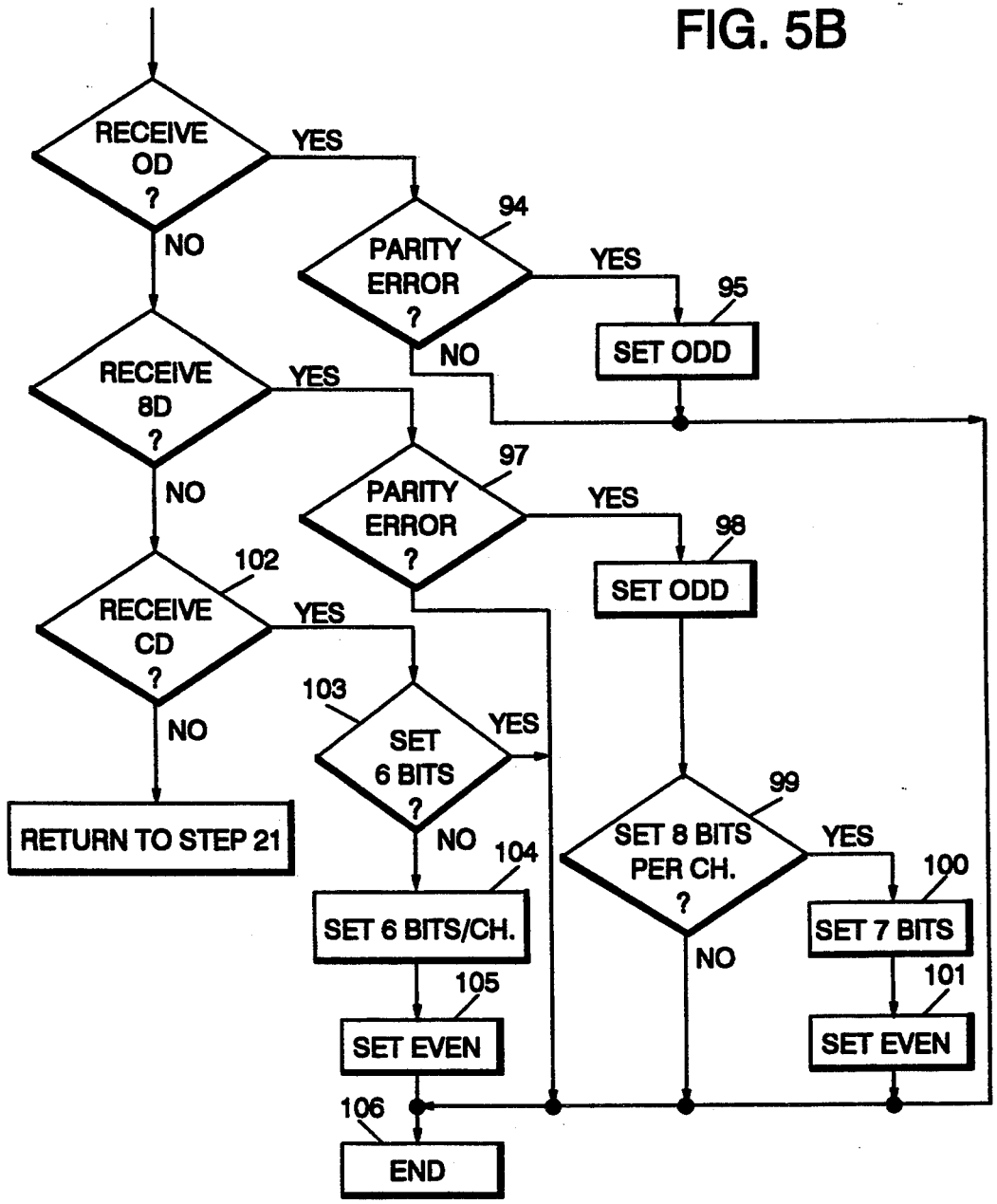

METHOD AND APPARATUS FOR SETTING ASYNCHRONOUS TRANSMISSION CHARACTERISTICS IN A TELECOMMUNICATION EQUIPMENT INCLUDING A SCC

TECHNICAL FIELD OF THE INVENTION

The invention relates to a method and apparatus for setting asynchronous transmission characteristics in telecommunication equipment including a Serial Communication Controller (SCC) operating at different transmission rates, parity modes and numbers of bits per character.

BACKGROUND ART

The asynchronous telecommunication mode is widely used and known in the telecommunication field. The design of telecommunication equipment operating in asynchronous mode has been made easier since the development and the wide marketing of specific components known as Serial Communication Controllers (SCCs), such as the SIGNETICS SCN26562. Such components provide full management of an asynchronous link with the desired transmission characteristics, namely speed, parity and the actual number of data bits per character.

A typical example of the use of such a Serial Communication Controller (SCC) is illustrated in FIG. 1 where there is depicted an asynchronous link between a Data Terminating Equipment (DTE) 1 and Data Circuit Terminating Equipment (DCE) 10 including an SCC 20 controlled by a microprocessor 11 associated with RAM storage 13, PROM storage 12 and I/O devices 15. The DCE can be used for allowing the connection of DTE 1 to local communication controller equipment.

The success of asynchronous telecommunication transmission in general, and the wide variety of equipment used in the telecommunication field have resulted in many characteristics being handled by SCC's.

The speed which is most often used in currently marketed DTE's generally has one of the following values: 75, 300, 600, 1200, 1800, 2400, 4800, 9600, 19200 bauds. The parity is selected to be an EVEN parity mode, an ODD parity mode or a NO PARITY mode. With respect to the number of bits per character, the transmission generally uses 6, 7 or 8 bits per character.

It therefore appears that numerous asynchronous transmission characteristics are used in the telecommunication field and communication between transmitting and receiving equipment will require that the same characteristics be used by each. The adaptation of one DCE to the characteristics of a given DTE generally requires intervention of an operator during the installation on both transmitting and receiving equipment.

An automatic setting of the speed and parity characteristics known as Autobaud exists in the prior art. It is based on the analysis of the first characters received from the DTE. In the AUTOBAUD method, the operator transmits a predetermined sequence of three characters, known to the asynchronous adapter. The three characters are usually "CR" (Carriage Return), ".", "CR". The receiving equipment, which is set to predetermined speed and parity characteristics, analyzes the received sequence of characters and derives therefrom appropriate speed and parity characteristics to be used so that the following transmission will be correctly received.

Existing practice consists of using the first character "CR" to determine the speed at which the DTE is sending characters. The following two characters, i.e. ".", "CR" are then used to derive the parity characteristics, but this only works it the number of data bits per character which are used by the transmitting and the receiving devices are identical.

Accordingly the known AUTOBAUD system operates only when the transmitting and receiving devices use the same number of bits per character. A manual operation for setting all the characteristics of the asynchronous transmission, speed, parity, and number of bits per character is still required otherwise. Providing for automatically setting all asynchronous transmission parameters has long been desired in the telecommunication field.

OBJECTS OF THE INVENTION

An object of the present invention is to provide for automatically setting of the asynchronous communication characteristics.

BRIEF SUMMARY OF THE INVENTION

According to the present invention, the problem is solved by a method which includes the step of setting the SCC at the highest communication rate in a NO PARITY mode with a number of 8 bits per character. The method further includes the step of receiving a predetermined sequence of characters consisting in a succession of "Carriage-Return" (CR) and "." characters. A still further step is the processing of at least three received characters ("CR", ".", "CR") with the sub-step of analyzing said received characters by comparing them with predetermined values simultaneous with the detection of parity errors, said processing step further involving the sub-step of setting in response to said analyzing sub-step said SCC with the actual number of bits per character and the real parity mode which is used in said asynchronous transmission.

Preferably, the method further includes analysis of the two characters in order to derive therefrom the rate at which the asynchronous characters are transmitted, and a first processing step of the character received by the SCC and corresponding to ".". During that first processing step, the SCC is set to an EVEN parity mode when the character is "2E" and there is one parity error. The SCC is set to 7 bits per character when the character "AE" is detected. Finally, the SCC is set to operate at 6 bits per character when the character "EE" is detected.

The method further includes a second processing step to analyze the character received by the SCC corresponding to "CR". During that step, the SCC is set to an ODD parity mode when the character "OD" is detected and there is one parity error. The SCC is set to 7 bits per character and an EVEN parity mode when the detected character is "8D" and there is one parity error. The SCC is set to EVEN parity and 6 bits per character when the value "CD" is detected.

DETAILED DESCRIPTION OF THE PREFERRED EMBODIMENT OF THE INVENTION

Figure 1:
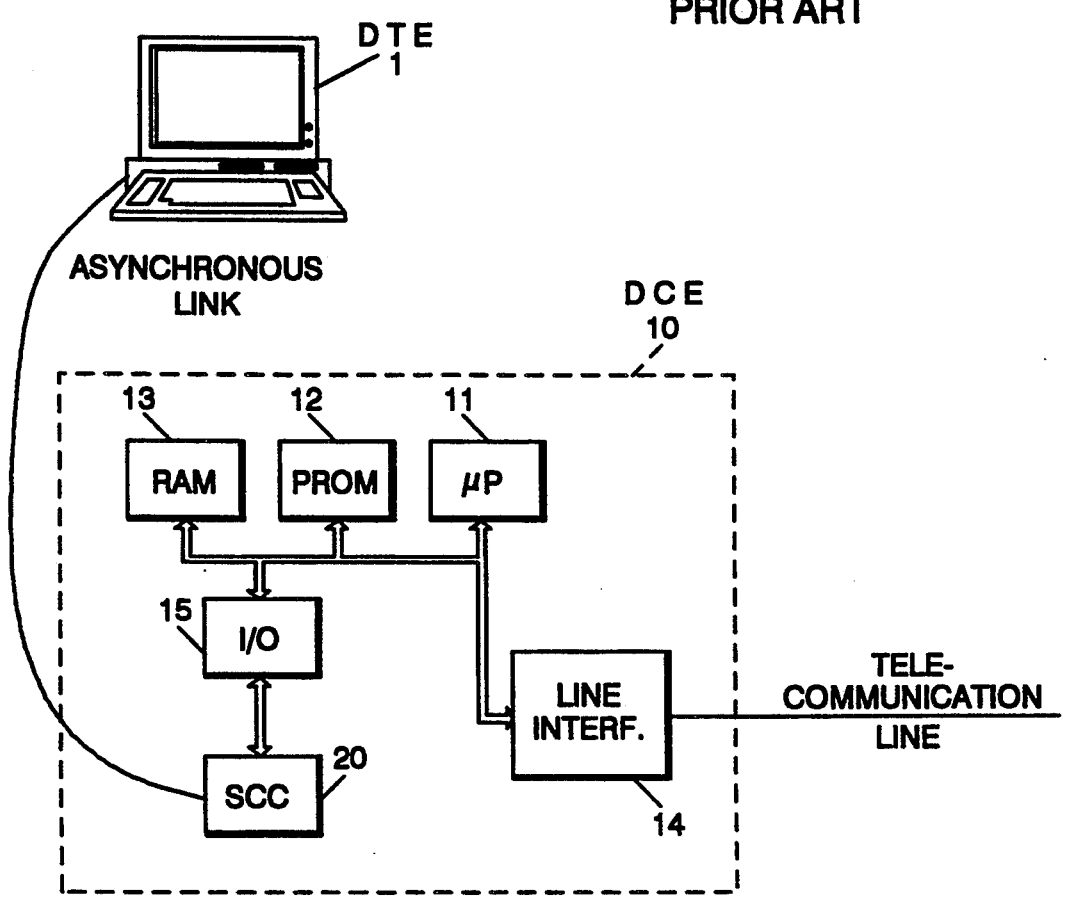
FIG. 1 illustrates a typical prior art use of a Serial Communication Controller providing multiple asynchronous communication characteristics.
Figure 2B:
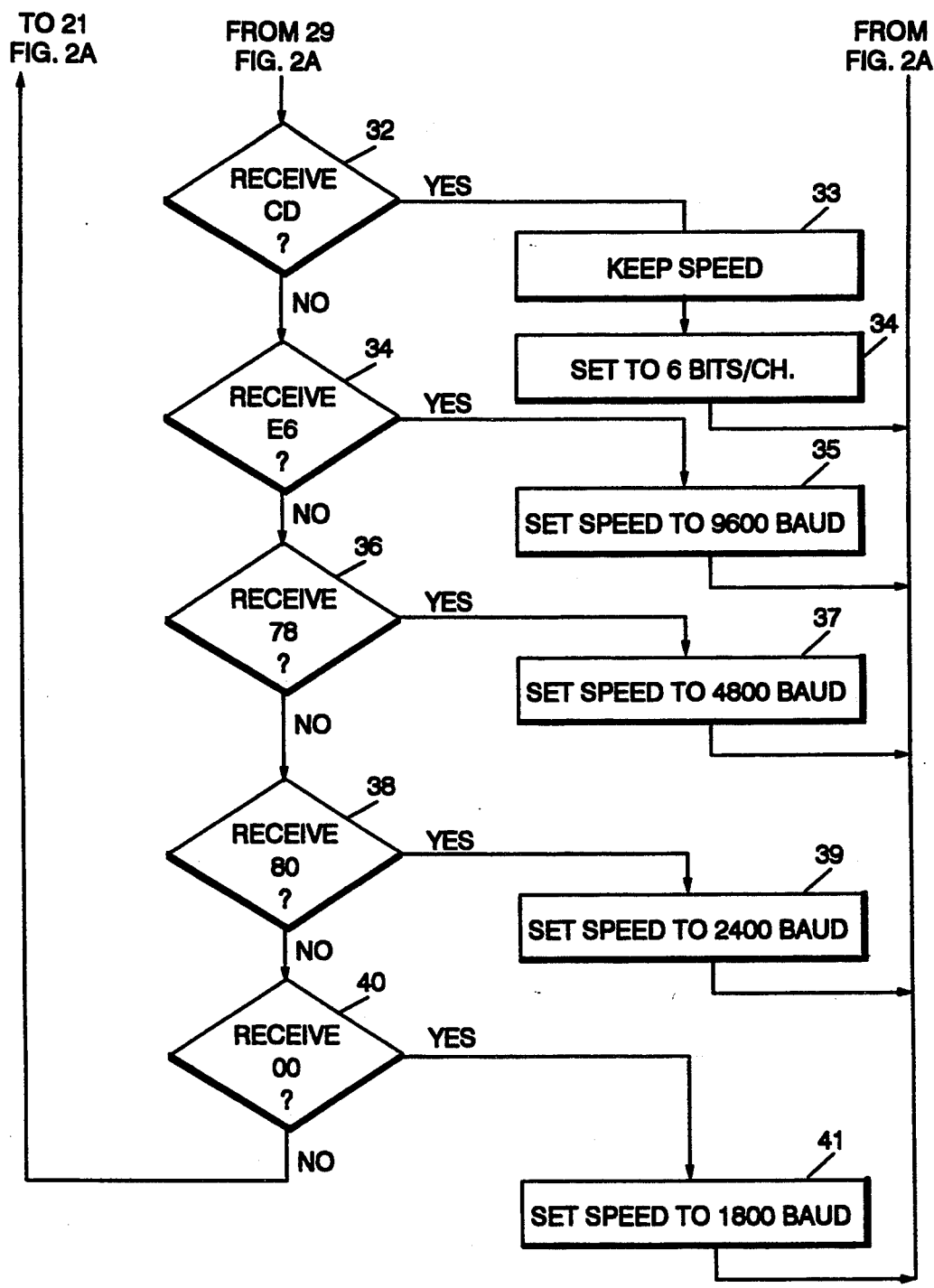
FIGS. 2, 3, 4 and 5 are flow charts illustrating the method of setting the asynchronous transmission characteristics in accordance with the present invention.

FIG. 2 illustrates the method of setting the asynchronous transmission parameters in accordance with the present invention. At the power-on of the machine, the user is expected to type the following sequence of characters: "CR", ".", "CR", "/", "CR". This sequence will be transmitted to the serial communication controller located within DCE 10 connected to the DTE. The characters "CR", "." are chosen firstly because they coincide with the known traditional AUTOBAUD method which is widely used in the telecommunication field for setting speed and parity parameters of asynchronous transmissions, and secondly, because they both have inverted parity and offer a sufficient number of signal transitions. It should however be noted that the method could be used with other predetermined characters. The method provides, in most cases, especially when the actual speed is greater than or equal to 1200 bauds, determination of the asynchronous transmission parameters after the reception of the first three characters: "CR", ".", "CR", as in the traditional AUTOBAUD method which only provided the speed and parity of the transmission. For transmission speed less than to 1200 bauds, a succession of 5 characters will generally be required in order to determine the asynchronous transmission parameters.

With respect to FIG. 2, at the power-on of the machine, step 21, microprocessor 11 controls Serial Communication Controller 20, for instance a SIGNETICS SCN26562 Serial Communication Controller, so as to set the transmission parameter to the highest speed of 19,200 bauds, to "None" parity, and to a number of 8 bits per character. This is achieved by storing appropriate values into the internal registers of SCC 20 via an I/O device.

Then, at step 22, processor 11 waits for the reception of the first character which is entered through the keyboard of DTE 1. When one character is received by SCC 20, SCC 20 generates an interrupt signal to processor 11 in order to inform it that one character has been received and is available. From this instant, processor 11 starts a timer, at step 23, which is used for resetting the whole asynchronous transmission parameter determination method when the timer reaches a predetermined value. This ensures that the parameter determination method will be restarted again if it does not successfully complete after a predetermined period. If the user does not type the sequence of characters "CR", ".", "CR", etc. which he is expected to enter into the system through the keyboard, for instance if he types the sequence "q", "w", "e", "r", "t", "y", the method will not succeed. Step 22 ensures that the method will be reinitialized when the predetermined period has elapsed so that the parameter determination method succeeds if the user then transmits the expected sequence "CR", ".", "CR", ".", "CR" and ".". In the preferred embodiment of the invention, the re-initialization of the method is performed after a period of 3 to 6 seconds.

Then in step 24, the processor waits for a occurrence of the break signal. This generally occurs when the actual speed of the asynchronous transmission is very low with respect to the speed at which the SCC has been set, i.e., 19200 bauds. For instance, if the DTE transmits the asynchronous characters at a rate of 75 bauds the SCC, which is set to 19200 bauds, does not detect any transition of the analog signal for more than two baud times. In this case, the SCC concludes that there exists a Break situation and generates an interrupt which is transmitted to processor 11. By reading the contents of the appropriate internal register of the SCC 20, processor 11 is informed of the existence of the break signal that the SCC has detected. If the SCC 20 has detected a BREAK signal in step 24, then processor 11 concludes that a low speed should be selected and controls SCC 20 so as to set the speed parameter to a value of 1200 bauds, step 25. Processor 11 then sets an internal flag loaded within RAM 13, at step 26, and then goes to step 42 of FIG. 3 in order to wait for the next character, ".", which is expected to be received. In the case where no BREAK signal has been detected, processor 11 checks whether the received character is equal to "0D" (in hex.), in step 27, in which case it proceeds to step 28 where the selected speed of 19200 bauds is maintained. Then the process proceeds to step 42 in order to wait for the second character. If the first received character is not equal to "0D" then processor 11 goes to step 29 in order to compare it with the value "8D". If both are equal, then the processor maintains the selected speed of 19200 bauds, in step 30, and also sets the number of bits per character to a value of 7, in step 31. The process then proceeds to step 42. If the first received character is not equal to "8D" in step 29, the process goes to step 32 where processor 11 compares it with the value "CD". If they are equal, the process proceeds to step 33, where the processor still maintains the selected speed of 19200 bauds, but also sets the number of bits per character to a value of 6, in step 34. The process then proceeds to step 42. If that first received character is not equal to "CD" in step 32, the process goes to step 34 where processor 11 compares it with the value "E6". In the case of a match the process proceeds to step 35 where processor 11 stores the appropriate value in the internal registers of SCC 20 so that it is set to operate at a speed of 9600 bauds. The process then proceeds to step 42 where the second character is awaited. If the first received character is not equal to "E6" in step 34, the process goes to step 36 where processor 11 compares it with the value "78". If they are equal, the process proceeds to step 37 where processor 11 stores the appropriate value in the internal registers of SCC 20 so that it is set to operate at a speed of 4800 bauds. The process then proceeds to step 42 where the second character is awaited. If the first received character is not equal to "78" in step 36, the process goes to step 38 where processor 11 compares it with the value "80". If both values are equal, the process proceeds to step 39 where processor 11 sets the SCC to an asynchronous communication speed of 2400 bauds. The process then proceeds to step 42. If the first received character is not equal to "80" in step 38, the process goes to step 40 where processor 11 compares it with the value "00". If both values are equal, the process proceeds to step 41 where processor 11 sets the SCC to a speed of 1800 bauds. The process then proceeds to step 42. If the first received character is not equal to "00", processor 11 concludes that the analysis of the first received character has not succeeded. This might occur in the case where the user did not type the expected character "CR", or still if the asynchronous transmission uses a number of bits per character having a (rare, but still existing) value of 5. In such a case, the process is reinitialized and goes back to step 21.

Figure 3A:
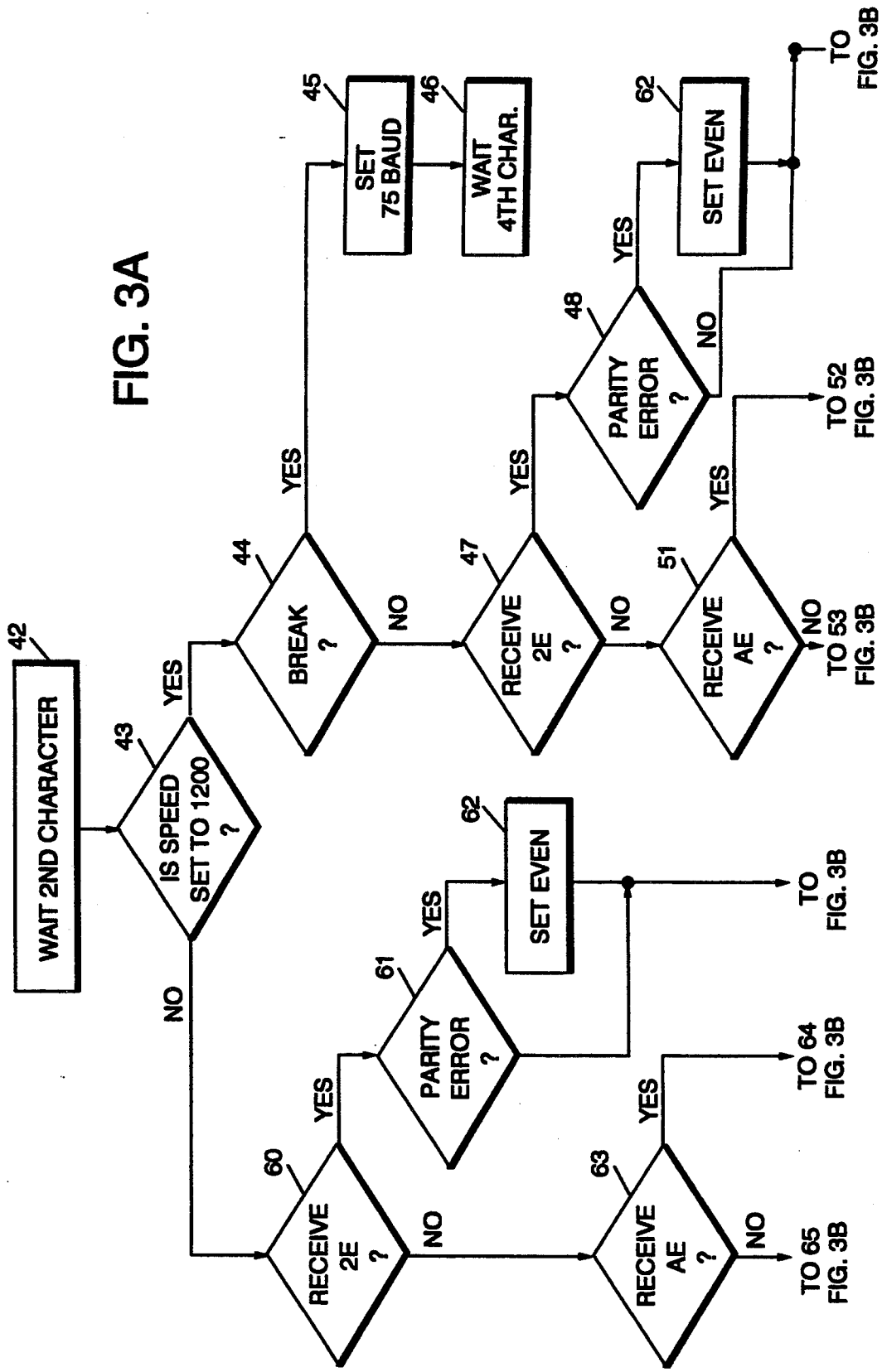
Figure 3B:
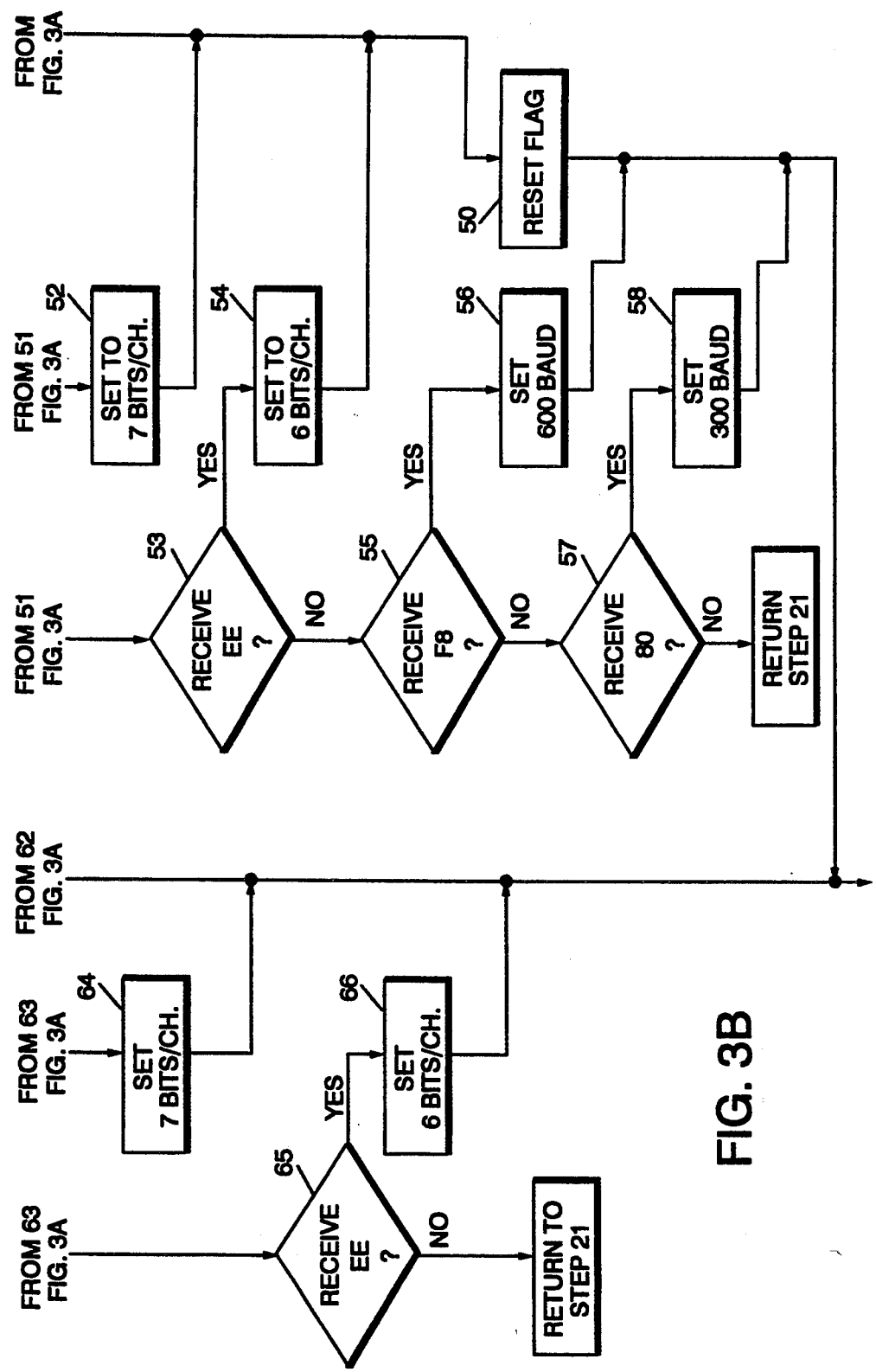
Figure 4:
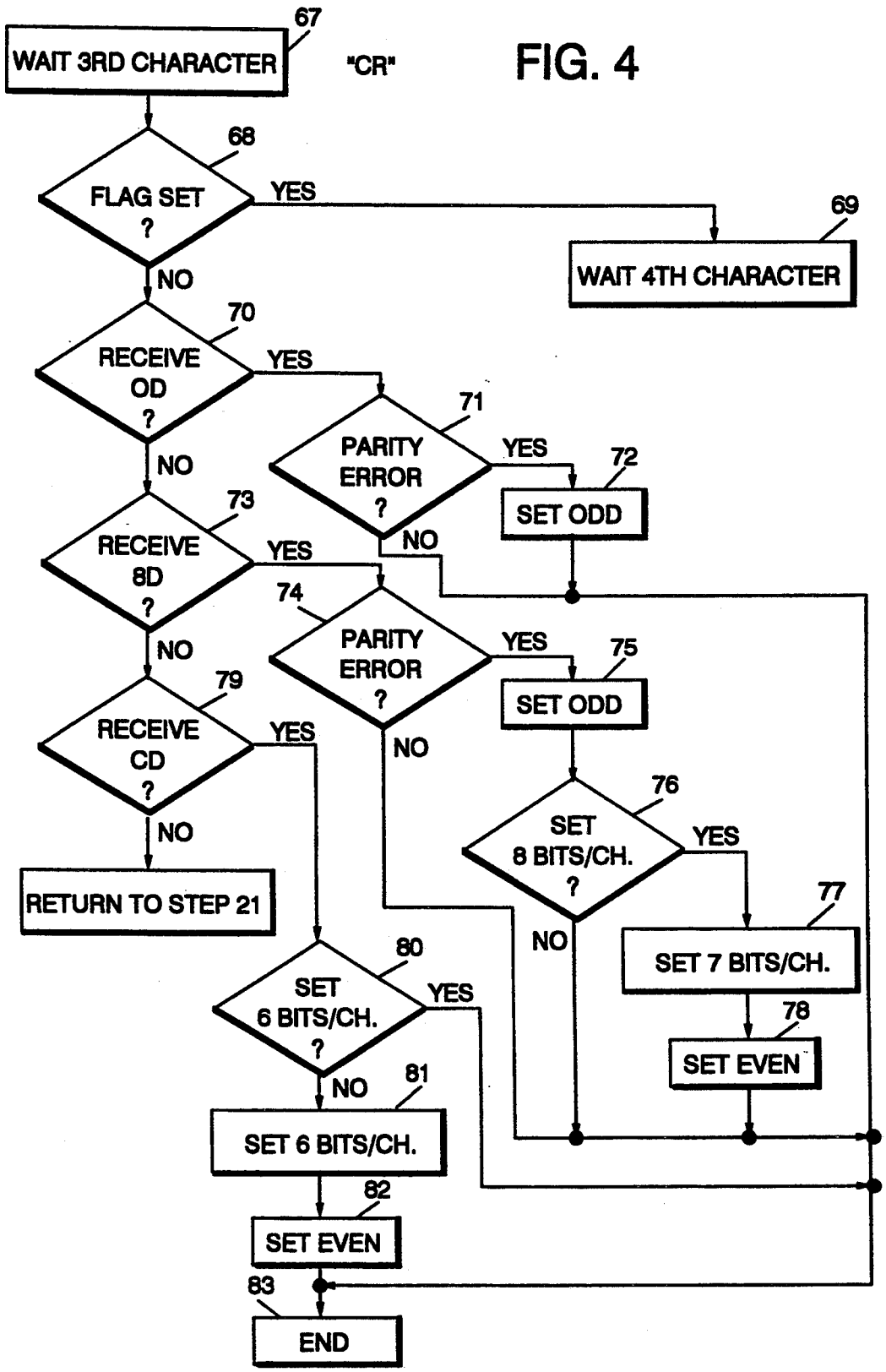

In the reverse case, that is to say, if the analysis of the first character has succeeded, processor 11 waits for the occurrence of the second character in step 42 of FIG. 3. In the preferred embodiment of the invention, the processing of this second character does not, however, begin before a period of 100 milliseconds has elapsed from step 23. This prevents erroneous signals from being considered by the system. Whenever the second character is received by SCC 20, the latter generates an interrupt signal to processor 11 in order to inform it that the second character can be read. Processor 11 checks the internal flag in step 43, which has been possibly set in preceding step 26, in order to determine whether the SCC 20 has been set to a speed of 1200 bauds. If it has processor 11 goes to step 44 where it tests the occurrence of a break signal detected by the SCC 20, in which case, the processor controls SCC 20 so that the speed is set to a value of 75 bauds, in step 45. It should be noted that, at this step, the actual transmission rate could also have a value of 110 or 200 bauds and the processor is unable to determine which of the three values is actually used. However, since the rate of 75 bauds is widely used compared to the rather rare 110 and 200 bauds values, the method will succeed in most cases. At step 46, the processor waits for the occurrence of the fourth character which is expected to be a ".". If no break signal was detected in step 44, then the process proceeds to step 47 where the second received character is compared to the value "2E". If the two values are identical, then the processor determines whether a parity error has also occurred, in step 48. In the case of such a parity error, the processor controls SCC 20 by loading the appropriate values into its internal registers so that the SCC operates with an EVEN parity mode, at step 49. Then the process proceeds to step 50 where the flag is reset. If no parity error was detected in step 48, the process also proceeds to step 50. If the second received character was not equal to "2E" in step 47, the processor compares it with the value "AE", in step 51. If a match occurs, processor 11 sets SCC 20 to operate with a number of bits per character which is equal to 7, at step 52, and the process then proceeds to step 50. If the second received character was not equal to "AE" in step 51, the processor compares it with the value "EE", in step 53. If they match, processor 11 sets SCC 20 to operate with a number of bits per character which is equal to 6, step 54, and the process then proceeds to step 50. If the second received character was not equal to "EE" in step 53, the processor compares it with the value "F8", in step 55. If an equality occurs, processor 11 sets SCC 20 to operate at a rate of 600 bauds, at step 56, and the process then proceeds to step 67, in order to wait for the third character which is expected to be a "CR". If the second received character was not equal to "F8" in step 55, the processor compares it with the value "80", in step 57. If a match occurs, processor 11 sets SCC 20 to operate at a rate of 300 bauds, in step 58, and the process then proceeds to step 67 in order to wait for the third character. If the second received character is not equal to "80" in step 57, processor 11 concludes that the analysis of the second received character has not succeeded. As described above, this might occur in the case where the user did not type the expected character ".", or if the asynchronous transmission uses a number of bits per character having a value of 5. In such a case, the process is reinitialized again and goes back to step 21.

If the test of step 43 indicated that a higher speed was selected during the analysis of the second received asynchronous character, the process goes to step 60 where the second received character is compared to the value "2E". If the two are equal, then the process checks whether a parity error has occurred, in step 61, in which case the process sets the SCC so that it operates in a EVEN parity mode, at step 62. Then process then proceeds to step 67 in order to wait for the fourth character, as it does if no parity error was detected in step 61. If the second received character was not equal to "2E" in step 60, the processor compares it with the value "AE", in step 63. If they are equal, the processor controls SCC 20 so that it is set to operate with a number of 7 bits per character, at step 64. The process then proceeds to step 67. If the second received character was not equal to "AE" in step 63, the processor compares it with the value "EE", in step 65. If they are equal, the processor controls SCC 20 so that it operates with a number of 6 bits per character, in step 64. The process then proceeds to step 67. If the second received character was not equal to "EE" in step 65, processor 11 concludes that an erroneous analysis of the second received character occurred and goes back to step 21.

If the analysis of the second received character has succeeded, the correct transmission rate is considered to be determined. The processor then waits for the third character which is expected to be a "CR", in step 67, except the case where a second break signal has been detected in preceding step 44. In step 68, the processor tests its internal flag. If the latter is set, then the process proceeds to step 69, and the analyzing steps of the third character are discarded and the process directly proceeds to step 84 for processing the fourth character.

If the flag is not set in step 68, the then processor compares the third received character with the value "0D", at step 70. If the values are equal, then the processor determines whether a parity error has occurred, in step 71, in which case the SCC is set to operate with an ODD parity mode, at step 72. Then, the asynchronous transmission parameters determination process completes, at step 83. In the case where no parity error was detected in step 71, the process also proceeds to ending step 83. If the third received character was not equal to "0D" in step 70, then the processor compares it with the value "8D", at step 73. If they are equal, then the processor checks for the existence of a parity error, in step 74. If a parity error exists, the processor sets SCC 20 in an ODD parity mode, at step 75 and then determines whether the SCC operating with a number of bits per character equal to 8, at step 76. If it is, the process controls SCC 20 so that the number of bits per character is set to 7, in step 77, and the parity is set to EVEN, at step 78. The asynchronous transmission parameter determination method then completes. If the number of bits per characters was not equal to 8 in step 76, or in the case where no parity error was detected in step 74, the determination method also completes. If the third received character was not equal to "8D" in step 73, the processor compares it with the value "CD", in step 79. If they match, then the processor checks whether the number of bits per character is set to a value of 6, at step 80. If it is, the determination process goes to step 83 and completes. If the number of bits per character is not set to 8 at step 80, then the processor controls SCC 20 so that it is set to a number of 6 bits per character, at step 81, and then to an EVEN parity mode, in step 82. The process then proceeds to step 83 and completes. If the third received character was not equal to "CD" in step 79 processor 11 concludes that an erroneous analysis of that character occurred and goes back to step 21.

Figure 5A:
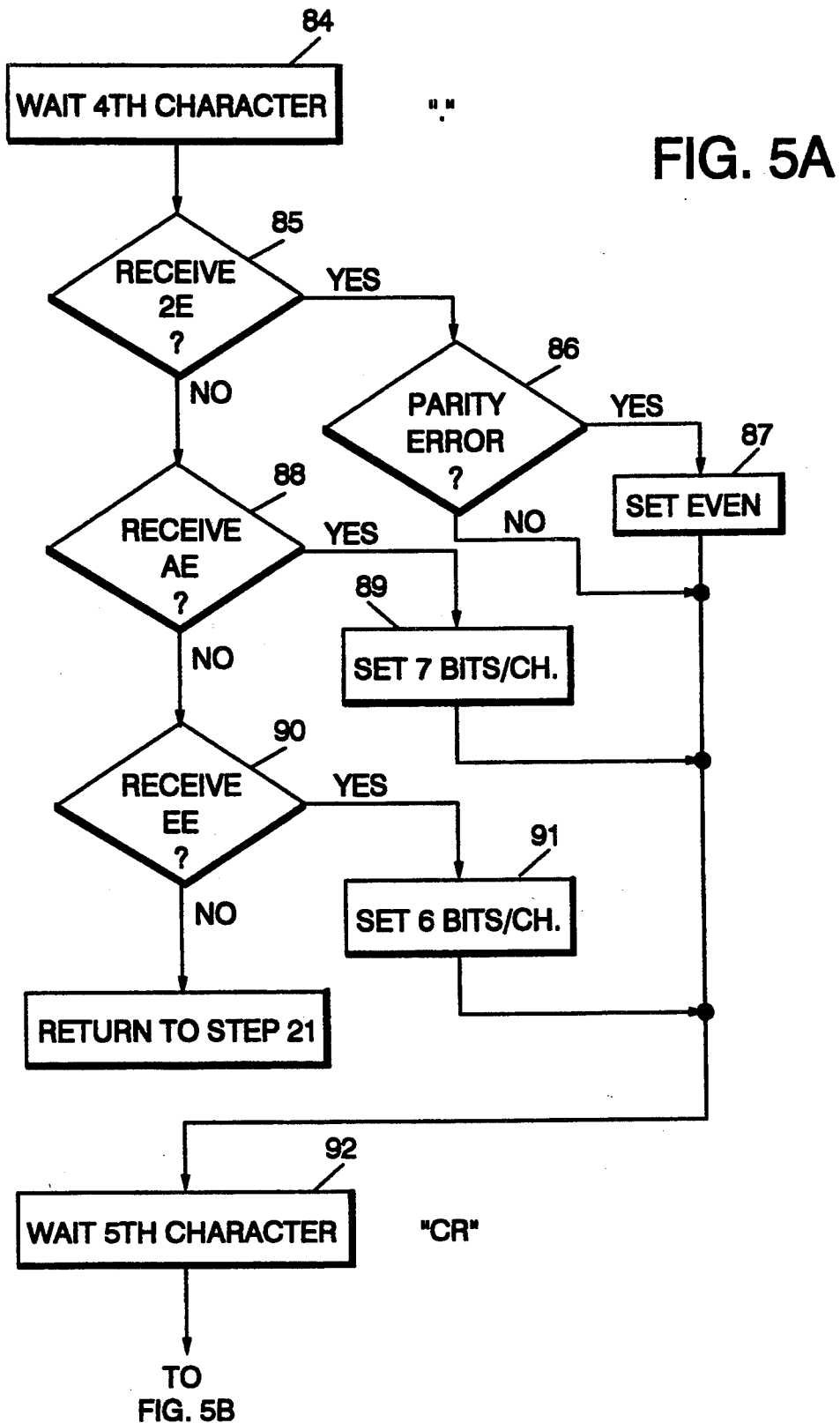

In the case where a second break signal was detected in step 44 of FIG. 3, that is to say in the case of very low transmission rate, the parameter determination method requires the analysis of a fourth and a fifth character which are expected to be equal to "." and "CR". The analysis method of that fourth character is illustrated in FIG. 5 and is quite similar to the analysis steps of the second character in higher rates, i.e., to steps 60, 61, 62, 63, 64, 65 and 66; and also to steps 47–54. This allows minimization of the size of the microcode instructions stored in PROM 12 required to implement the method according to the present invention.

More specifically, when the fourth character has been received in step 84 (and which is expected to be a "."), the process proceeds to step 85 where the fourth received character is compared to the value "2E". If the two are equal, then the process checks whether a parity error has occurred, in step 86, in which case the process sets the SCC so that it operates in a EVEN parity mode, at step 87. Then process proceeds to step 92 in order to wait for the fifth character, and does so as well if no parity error was detected in step 86. If the fourth received character was not equal to "2E" in step 85, the processor compares it with the value "AE", in step 88. If they are equal, the processor controls SCC 20 so that it is set to operate with a number of 7 bits per character, at step 89. The process then proceeds to step 92. If the fourth received character was not equal to "AE" in step 88, the processor compares it with the value "EE", at step 90. If they are equal, the processor controls SCC 20 so that it operates with a number of 6 bits per character, step 91. The process then proceeds to step 92. If the second received character was not equal to "EE" in step 90 processor 11 concludes that an erroneous analysis of the fourth received character occurred and goes back to step 21.

In step 92, the processor waits for the occurrence of the fifth character which is transmitted through the asynchronous telecommunication Link, and which is expected to be a "CR". When it is available in SCC 20, the processor compares it with the value "0D", at step 93. If the two are equal, then the processor checks for the occurrence of a parity error, in step 94. If such a parity error has been detected, then the processor controls SCC 20 to set it to an ODD parity mode, in step 95 and the process then goes to step 106 which is the completion of the asynchronous transmission parameter determination. If no parity error was detected in step 94, the process also completes. If the fifth received character was not equal to "0D" in step 93, then the processor compares it with the value "8D", in step 96. If the two values are equal, then the processor checks for the occurrence of a parity error, in step 97. If a parity error was detected, the process proceeds to step 98 where the SCC is set to an ODD parity mode. Then, the process checks the value of the actual number of bits per character which is being used by the SCC, in step 99. If this number is equal to 8, the process controls SCC 20 so that it is set to 7 bits per character, in step 100. Then, the SCC is set to an EVEN parity mode, at step 101 and the process completes. If no parity error was found in step 97, or if the number of bits per character was equal to 8 in step 99, the process also goes to step 106 and the asynchronous transmission parameter determination process completes. If the fifth received character was not equal to "8D" in step 96, then the processor compares it with the value "CD", at step 102. If the two values are equal, then the processor checks whether the number of bits per character has been set to 6, in step 103. If it was, then the process goes to step 106 and completes. If it was not, the processor controls SCC 20 so that it is set to a number of 6 bits per character, at step 104, and to an EVEN parity mode, in step 105. The process then goes to step 106 and completes. If the fifth received character was not equal to "CD" in step 102 processor 11 concludes that an erroneous analysis of that character occurred and goes back to step 21.

It should be noted that the fifth character analysis process is very similar to the third character analysis, in particular steps 70–83. This allows minimization of the length and the complexity of the microcode software program which is required for carrying out the method according to the present invention.

I claim:

1. In telecommunication equipment having a Serial Communication Controller (SCC), a method for setting asynchronous transmission characteristics of transmission rate, parity mode, and the number of bits per character of the Serial Communication Controller (SCC) to match an actual transmission rate, parity mode and number of bits per character of a signal asynchronously received by the equipment, comprising the steps of:

setting the SCC at the highest communication rate that is supported by the SCC, and setting the SCC in a no parity mode with 8 bits per character;

receiving a predetermined sequence of characters comprising a succession of "Carriage-Return" (CR) and "." characters;

processing at least three received characters ("CR", ".", "CR") by comparing said received characters with predetermined character values corresponding to specific transmission rates, parity modes, and number of bits per character;

detecting parity errors if said received characters have a parity mode different than the no parity mode;

setting, in response to said processing step and said detecting step, said SCC with the number of bits per character and the parity mode of said received characters.

2. The method of claim 1 and in addition the steps of:

analyzing the first two received characters in order to infer the rate at which said received characters were transmitted;

processing the second character detected by said SCC and corresponding to "." by setting said SCC to an EVEN parity mode upon detection of a character "2E" and a parity error, by setting said SCC to seven bits per character upon detection of an "AE" character, and by setting said SCC to six bits per character upon detection of an "EE" character; and processing the first character detected by said SCC corresponding to "CR" after at least two characters have been received by setting said SCC to an ODD parity mode upon detection of an "OD" character and a parity error, by setting said SCC to ODD parity upon detection of an "8D" character and a parity error and setting said SCC to EVEN parity and seven bits per character upon detection of an "8D" character, and a parity error, and said SCC was set to eight bits per character previously, and by setting said SCC to an EVEN parity mode and six bits per character if said SCC was not set to six bits per character previously and upon detection of a "CD" character.

3. The method of claim 2 wherein the step of inferring the rate of transmission comprises the steps of:
   initializing said SCC at an asynchronous transmission rate of 19200 baud;
   analyzing the first character received by said SCC;
   setting said SCC to an operating rate of 1200baud upon detection of a break signal occurring in the transmission;
   setting the number of bits per character to 7 upon detection of an "8D" character;
   setting the number of bits per character to 6 upon detection of a "CD" character;
   setting said SCC to an operating rate of 9600 baud upon detection of an "E6" character;
   setting said SCC to an operating rate of 4800 baud upon detection of a "78" character;
   setting said SCC to an operating rate of 2400 baud upon detection of an "80" character;
   setting said SCC to an operating rate of 1800 baud upon detection of a "00" character.

4. The method according to claim 3 and in addition the steps of:
   upon detection of a "2E" character and a parity error, setting said SCC to an EVEN parity mode;
   upon detection of an "AE" character, setting said SCC to operate at seven bits per character;
   upon detection of an "EE" value, setting said SCC to operate at 6 bits per character.

5. The method according to claim 4 and in addition the steps of:
   upon detection of an "OD" character and a parity error, setting said SCC to an ODD parity mode;
   upon detection of an "8D" character and a parity error, setting said SCC to operate with an ODD parity, and further setting said SCC to operate at seven bits per character and EVEN parity if said SCC was set to operate at eight bits per character;
   upon detection of a "CD" character if said SCC was not already set to six bits per character, setting said SCC to operate with six bits per character and EVEN parity mode.

6. In telecommunication equipment having a Serial Communication Controller (SCC), apparatus for setting asynchronous transmission characteristics of transmission rate, parity mode, and the number of bits per character transmitted to match the transmission rate, parity mode and number of bits per character of a signal asynchronously received by the equipment, comprising:
   first means for setting the SCC at a predetermined communication rate, parity mode, and number of bits per character;
   means for receiving a predetermined sequence of characters with inverted parity and a sufficient number of signal transitions;
   means, cooperative with said means for receiving, for processing a plurality of said received characters of said predetermined sequence in order to infer the rate at which said plurality of characters were transmitted;
   means, cooperative with said means for processing, for analyzing said plurality of received characters by comparing said received characters with predetermined values corresponding to specific transmission rates, parity modes and number of bits per character;
   means, cooperative with said means for analyzing, for detecting parity errors when said received characters have a parity mode different than said predetermined parity mode;
   means cooperative with said means for analyzing and said means for detecting, for inferring the parity mode and bits per character of said received predetermined sequence from the outputs of said analyzing means and said detecting means; and
   second means, cooperative with said means for inferring, for setting said SCC to a rate, parity mode, and bits per character equal to that of said received predetermined sequence.

7. The apparatus of claim 6 and in addition:
   Data Circuit Terminating equipment for transmitting said predetermined sequence of characters.

8. In telecommunication equipment having a Serial Communication Controller (SCC), a method for setting the asynchronous transmission characteristics of parity mode and the number of bits per character transmitted by the equipment to match the parity mode and number of bits per character of a signal asynchronously received by the equipment, comprising the steps of:
   setting the SCC at a predetermined parity mode and number of bits per character,
   receiving a predetermined sequence of characters with inverted parity and a sufficient number of signal transitions;
   analyzing a plurality of received characters by comparing said received characters with predetermined values corresponding to specific transmission rates, parity modes, and number of bits per character;
   detecting parity errors when said received characters have a parity mode different than said predetermined parity mode;
   inferring the parity mode and bits per character of said received predetermined sequence from the results of said analyzing and determining steps; and
   setting said SCC to the parity mode and bits per character of said predetermined sequence.

9. The method of claim 8 and in addition the steps of:
   processing a plurality of characters of said predetermined sequence of characters in order to infer the rate at which said received characters were transmitted; and
   setting said SCC to the transmission rate inferred from said plurality of characters.

* * * * *